Patented Aug. 27, 1946

2,406,561

UNITED STATES PATENT OFFICE 2,406,561

AZEOTROPIC DISTILLATION OF METHANOL FROM ADMIXTURE WITH ACRYLIC ESTERS

Chessie E. Rehberg, Philadelphia, Pa., assignor to United States of America as represented by Claude R. Wickard, Secretary of Agriculture, and his successors in office No Drawing. Application December 27, 1943, Serial No. 515,799

2 Claims. (Cl. 202—42)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a method for removing alcohols from mixtures containing acrylic esters.

The lower alkyl acrylates form azeotropic mixtures with several of the lower alkanols and hence these acrylates and alcohols cannot be separated from each other by simple distillation. It is often desirable, however, to be able to effect such a separation, as for example, in the preparation of a higher acrylic ester from a lower one by alcoholysis. Thus, in the production of ethyl, butyl, decyl, or other acrylic esters by the alcoholysis of methyl acrylate, methanol is formed and its continuous removal is desirable in order to increase the rate of reaction and the completeness of the conversion to the higher acrylate. But since methanol forms a binary azeotrope with methyl acrylate, the methanol cannot be distilled out of the reaction mixture without the simultaneous removal of methyl acrylate. A similar difficulty is encountered in the alcoholysis of ethyl acrylate, since ethanol and ethyl acrylate also form a binary azeotrope. Furthermore, in the production of ethyl, propyl and isopropyl acrylates from methyl acrylate, numerous azeotropes are encountered, among them being methanol binary azeotropes with methyl, ethyl, propyl and isopropyl acrylates, ethanol binaries with methyl and ethyl acrylates, propanol binary with methyl acrylate and isopropanol binary with methyl acrylate. Methanol also distills azeotropically with methyl methacrylate. Accordingly, an object of this invention is to provide a method for the separation of the lower alkanols, particularly methanol, from admixture with acrylic esters particularly methyl acrylate.

I have found that the lower alkanols can be effectively separated from the lower acrylic esters as azeotropes with aliphatic hydrocarbons of suitable boiling range. The hydrocarbons used should have a boiling point low enough to allow separation from the acrylic ester by distillation but not so low as to decrease the reaction temperature and rate of reaction unduly. The lower boiling hydrocarbons should also be avoided because the percentage of alkanol in the azeotrope formed is less as the boiling point decreases. In general, the hydrocarbons should boil at least 5° C., preferably even 15° C. or more, below the boiling point of the acrylic ester, but not below about 40° C.

Hexanes, mixtures of hexanes, and petroleum fractions are examples of hydrocarbons which may be used. The optimum hydrocarbon is one boiling as high as possible and yet distilling far enough below the acrylic ester to allow it to be readily separated from the acrylate. The particular boiling range selected with depend on the distillation equipment which is to be used, the efficiency of the equipment, and the composition of the mixture being distilled.

Hydrocarbons of the type described do not form azeotropes with acrylic esters. Also, they are poor solvents for the lower alkanols, so that when the alkanol-hydrocarbon azeotrope is distilled and condensed the distillate separates into an upper layer which is mostly hydrocarbon and a lower layer which is mostly alkanol. This separation is even more marked when a small amount of water is added to the distillate. The addition of 1 percent by volume of water is effective.

The separation of the azeotropic distillate may be conveniently carried out continuously during the distillation. For this purpose the distillate is condensed, the hydrocarbon layer is continuously drawn off and returned to the still while the alcohol layer is continuously or intermittently drawn off from the separator.

My invention is illustrated by the following examples:

EXAMPLE I 2 moles (92 g.) of ethanol, 6 moles (516 g.) of methyl acrylate, 15 g. of hydroquinone, 1 cc. of sulfuric acid and 200 cc. of a petroleum hydrocarbon fraction having a boiling range of 58° to 61° C. were refluxed in a flask equipped with a 3 ft. fractionating column. The column had a total-condensation, partial take-off head from which condensate could be either returned to the column or sent into a continuous separator where the upper, or hydrocarbon layer, could be continuously drawn off and returned to the fractionating column near its top. The column was operated under total reflux until the temperature of the vapor at the still-head dropped to about 48° C. The rate of take-off was then adjusted so that the methanol was removed in the azeotrope as rapidly as it was produced in the reaction. This was achieved by keeping the temperature of the vapor at the still-head at 45° to 50° C., the take-off being closed when the temperature exceeded 50° C. Methanol slowly collected in the lower layer of the condensate in the separator and was removed, either continuously or intermittently. This methanol layer contained a considerable amount of the hydrocarbon and it was found that much more complete separation could be achieved by adding a small amount of water either to the condensate in the separator or to the methanol layer after its withdrawal.

After several hours of refluxing, the production of methanol ceased or became very slow, the reaction having proceeded virtually to completion. The hydrocarbon was then distilled out of the reaction mixture, leaving essentially a mixture of methyl and ethyl acrylates. By fractional distillation of this mixture, an almost quantitative yield of ethyl acrylate was obtained.

EXAMPLE II

Ethyl acrylate was prepared by proceeding as in Example I, except that the hydrocarbon was omitted from the reaction mixture, and instead of removing the methanol as its azeotrope with the hydrocarbon, it was removed as its azeotrope with methyl acrylate (B. P. of azeotrope, 62° C.). The methanol-methyl acrylate azeotrope thus obtained contained about 50 to 55 percent of methanol which was removed by adding about one volume of the hydrocarbon (B. P. 58° to 61° C.) to three volumes of the azeotrope and distilling as in Example I. In this way the methanol-hydrocarbon azeotrope was distilled off, the distillate was separated into two layers, the hydrocarbon layer was returned to the still and the process continued until all methanol had been removed from the methyl acrylate.

A large number of higher esters of acrylic acid can be made from methyl acrylate and the appropriate alcohol by the procedures described. Also, ethyl, propyl or butyl acrylate may be used instead of methyl acrylate and higher methacrylates can be made from methyl, ethyl, propyl or butyl methacrylate and an appropriate alcohol, using a hydrocarbon liquid to remove azeotropically the lower alcohol as it is produced. Further, the lower alkanols can be removed from mixtures containing one or more lower alkyl acrylic esters irrespective of whether or not the mixture arose from the alcoholysis of an acrylic ester.

Table I shows the approximate boiling points of the alkanol azeotropes formed with a petroleum hydrocarbon fraction boiling substantially within the range 58° to 61° C. It should be understood that a hydrocarbon compound or mixture of compounds of other suitable boiling range might also be used and that the azeotrope formed by this material would have a different boiling point and different composition from that formed by the material boiling from 58° to 61° C.

TABLE I

Boiling point of azeotropes of alkanols and petroleum fraction of boiling range 58° to 61° C.

| Alcohol | B. P. of azeotrope, °C. |
|---|---|
| Methanol | 46–48 |
| Ethanol | 52–53 |
| Propanol | 56–58 |
| Isopropanol | 55–57 |
| Butanol | 56–58 |

Having thus described my invention, I claim:

1. In the process of preparing higher acrylic esters by the alcoholysis of methyl acrylate, the step which comprises removing the methanol formed in the alcoholysis reaction by distilling it as an azeotrope with an aliphatic hydrocarbon having a boiling point at least 5° C. below the boiling point of methyl acrylate but not less than about 40° C.

2. In the process of preparing higher acrylic esters by the alcoholysis of methyl acrylate, the step which comprises removing the methanol formed in the alcoholysis reaction by distilling it as an azeotrope with a petroleum fraction having a boiling point at least 5° C. below the boiling point of methyl acrylate but not less than about 40° C.

CHESSIE E. REHBERG.